United States Patent [19]

Honda

[11] Patent Number: 4,946,274

[45] Date of Patent: Aug. 7, 1990

[54] PRESENTATION DEVICE USED IN COMBINATION WITH AN OVERHEAD PROJECTOR

[75] Inventor: Masami Honda, Oome, Japan

[73] Assignee: Kabushiki Kaisha Toshiba, Kawasaki, Japan

[21] Appl. No.: 342,778

[22] Filed: Apr. 25, 1989

[30] Foreign Application Priority Data

Apr. 28, 1988 [JP] Japan .............................. 63-57836[U]

[51] Int. Cl.⁵ .............................................. G03B 21/00
[52] U.S. Cl. .................................................. 353/122
[58] Field of Search .......... 353/122, DIG. 5, DIG. 3, 353/120

[56] References Cited

U.S. PATENT DOCUMENTS

3,642,359  2/1972  Kitch ............................. 353/DIG. 5
4,846,694  7/1989  Erhardt ................................ 353/122

Primary Examiner—William A. Cuchlinski, Jr.
Assistant Examiner—William C. Dowling
Attorney, Agent, or Firm—Finnegan, Henderson, Farabow, Garrett, and Dunner

[57] ABSTRACT

A presentation device for an overhead projector according to the present invention comprises a panel unit, which includes a liquid crystal panel, and a case for encasing the panel unit. At least one recess is formed in the outer surface of the panel unit which faces downward during use, and a movable leg is rockably mounted in the recess. During the use of the panel unit, the movable leg is caused to project from the recess by the urging force of a torsion coil spring. The case has an opening edge defining an inlet opening through which the panel unit is inserted into the case. The opening edge serves as an operating portion which is adapted to engage the movable leg, thereby rocking the leg against the urging force of the coil spring, so that the leg is housed in the recess, when the panel unit is inserted into the case through the inlet opening.

8 Claims, 2 Drawing Sheets

PRESENTATION DEVICE USED IN COMBINATION WITH AN OVERHEAD PROJECTOR

BACKGROUND OF THE INVENTION

1. Field of the Invention

The present invention relates to a presentation device used in combination with an overhead projector for projecting an image on a screen, and more particularly, to a presentation device which is placed on a stage of an overhead projector, to be substituted for data copies, such as manuscripts, graphs, etc.

2. Description of the Related Art

Overhead projectors are conventionally used to project enlarged images of data copies on a screen in places where many people gather to attend conferences, lectures, seminars, etc. Each projector is provided with a transparent stage for carrying a data copy, a light source housed in the body of the projector, and a magnifying reflector disposed over the stage, outside the body of the projector. The light source serves to radiate light through the stage. The reflector is used to reflect the light transmitted through the stage or the data copy, toward the screen.

In the overhead projector described above, the data copy on the stage must be formed of a transparent film bearing information to be projected, in view of the principle of projection on the screen. In projecting the image by means of the overhead projector, therefore, it takes a lot of time to prepare data copies in advance. If the number of copies to be used for the projection is large, moreover, the replacement of the data copy on the stage requires much time and labor.

In consideration of these circumstances, it has recently been proposed that a panel unit with a liquid crystal panel of a transmission type be used in place of a data copy formed of a transparent film. The panel unit, i.e., the liquid crystal panel, is connected to a so-called personal computer, especially a portable personal computer, to be usable as a presentation device of the computer. Thus, the panel of the panel unit can receive image signals from the personal computer, and display images based on the signals.

When in service, the panel unit is placed on the stage of the overhead projector. The liquid crystal panel of the panel unit, however, is liable to be adversely influenced by heat from the light source in the projector. It may be proposed, therefore, to attach legs to the underside of the panel unit, in order that a gap of a predetermined distance is defined between the panel unit and the stage of the projector, during the use of the panel unit. If the panel unit is provided with legs, however, its size or thickness must be substantial, and besides, a case for the protection of the panel unit or the liquid crystal panel is inevitably bulky. Accordingly, the whole presentation device, composed of the panel unit and the case, would be too large in size to be portable.

SUMMARY OF THE INVENTION

The object of the present invention is to provide a presentation device for an overhead projector, the whole structure of which, with a panel unit housed in a case, can be reduced in size, that is, in thickness, despite the existence of legs on the panel unit.

The above object is achieved by a presentation device for an overhead projector according to the present invention, which comprises: a panel unit including a frame, a liquid crystal panel of a transmission type mounted in the frame and capable of displaying information, including characters and images to be projected, at least one recess on the outer surface of the frame, a movable leg having a proximal end rockably mounted in the recess by means of a pin, the movable leg being adapted to be fully housed in the recess when rocked in one direction, and to have its distal end project from the recess when rocked in the other direction, urging means for urging the movable leg to rock in the other direction, and stopper means disposed in the recess and adapted to restrain the movable leg from rocking in the other direction when the movable leg is urged to rock in the other direction by the urging means; and a case capable of encasing the panel unit therein, the case having an opening edge defining an inlet opening through which the panel unit is inserted into the case, the opening edge serving as an operating portion adapted to engage the movable leg, thereby rocking the movable leg in the one direction against the urging force of the urging means, so that the movable leg is housed in the recess, when the panel unit is inserted into the case through the inlet opening, in the direction perpendicular to the axial direction of the pin.

According to the device described above, when the panel unit is taken out of the case, the movable leg of the panel unit is caused to project from the recess by the urging force of the urging means. When in service, therefore, the panel unit can be placed on a stage of the overhead projector with the aid of the movable leg. In this state, a gap of a predetermined distance, which depends on the height of the movable leg, is defined between the panel unit and the stage. Thus, the liquid crystal panel of the panel unit can be prevented from being adversely affected by heat from the projector.

As the panel unit is inserted into the case through the inlet opening, the movable leg projecting from the panel unit is housed in the recess. Despite the existence of the movable leg, therefore, the case must only be just large enough to house the panel unit alone. Thus, the case itself can be reduced in size, and besides, the whole presentation device, with the panel unit housed in the case, can be miniaturized.

When the panel unit is housed in the case, moreover, the movable leg of the panel unit is caused automatically to fall into the recess by the opening edge of the case. Thus, there is no need of a separate operating portion to cause the movable leg to be housed in the recess.

DETAILED DESCRIPTION OF THE PREFERRED EMBODIMENTS

Figure 1:
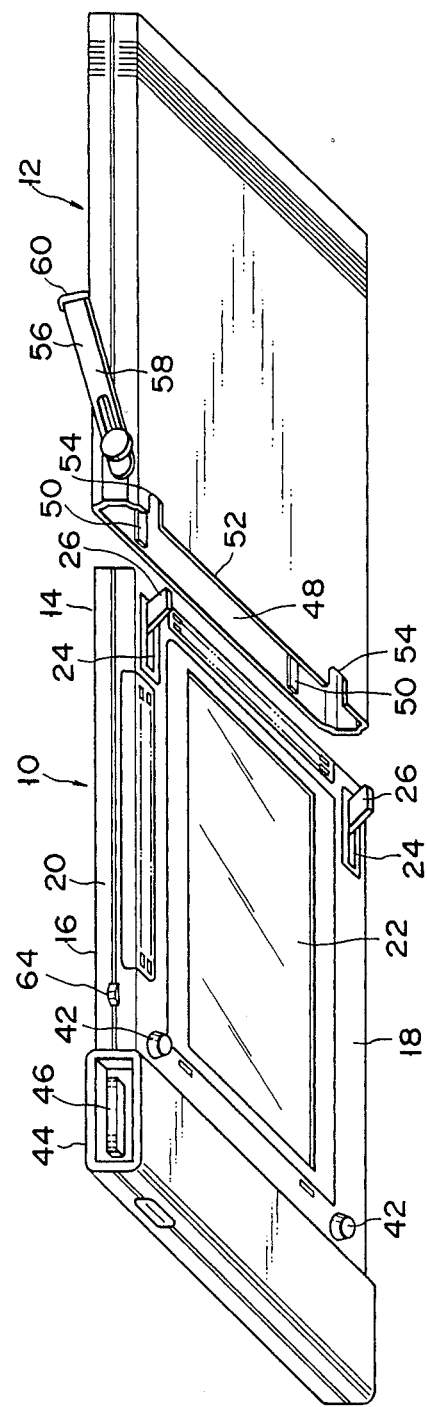
FIG. 1 is a perspective view of a presentation device according to an embodiment of the present invention, in which a panel unit is out of a case.

A presentation device shown in FIG. 1 is adapted to be used in combination with an overhead projector. The presentation device comprises panel unit 10 and case 12. Unit 10 includes rectangular plastic frame 14, which has upper frame surface 16, lower frame surface 18, and peripheral wall surface 20 connecting surfaces 16 and 18.

Liquid crystal panel 22 of a transmission type is mounted in frame 14. Since it is a conventional one, the panel will not be described in detail herein.

A pair of recesses 24 are formed individually at two corner portions beside one short side of lower frame surface 18 of frame 14. Each recess 24 is in the form of a groove extending along its corresponding long side of frame 14.

Figure 2:
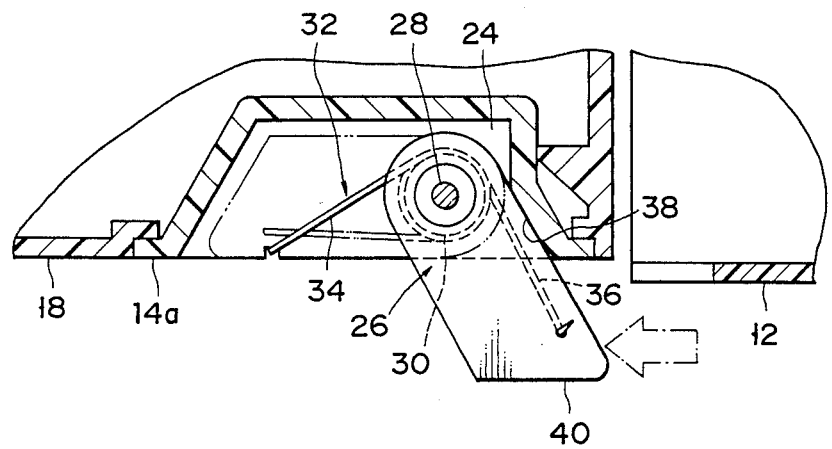
FIG. 2 is an enlarged sectional view showing a movable leg of the panel unit.

As shown in FIG. 2, the proximal end of plastic movable leg 26 is rockably mounted in each recess 24 by means of pin 28. More specifically, the proximal end of leg 26 is situated within recess 24, beside the one short side of panel unit 14. Pin 28 extends across the groove-shaped recess so that its opposite ends are supported on their corresponding inner walls facing each other. The proximal end of leg 26 is rounded. Further, leg 26 has a length such that it can be fully housed in recess 24, as indicated by two-dot chain line in FIG. 2, when it is rocked in one direction around pin 28.

Ring-shaped projection 30, concentric with pin 28, is formed on that side of movable leg 26 which is opposite to the side shown in FIG. 2. A coil portion of torsion coil spring 32 is mounted on projection 30. Spring 32 has a pair of arms 34 and 36. The tip end of arm 34 is anchored to an opening edge of recess 24, while that of arm 36 is anchored to leg 26 by being passed through a hole in the distal end portion of the leg. Spring 32 urges movable leg 26 in the other direction, i.e., in the counterclockwise direction of FIG. 2. Thus, leg 26 is pressed against inner wall 38 of recess 24 by the urging force of spring 32. Wall 38 is inclined so as to be able to be in face-contact with a side edge of leg 26. When leg 26 is in engagement with wall 38, as shown in FIG. 2, lower end face 40 of the leg is parallel to the surface of liquid crystal panel 22 of panel unit 10.

In the embodiment described above, each recess 24 is defined by plastic member 14a in the form of a bathtub. Alternatively, however, each recess 24 may be defined by means of frame 14 itself, without using member 14a.

A pair of fixed legs 42 are attached individually to two corner portions beside the other short side of lower frame surface 18 of panel unit 10. Each leg 42 is formed of a cylindrical member made of rubber. The height of each fixed leg 42 from surface 18 is equal to that of each movable leg 26 in the projected state shown in FIG. 2.

Circuit housing 44 is provided integrally with frame 14, adjoining the other short side of panel unit 10. It is rectangular in shape, extending along the other short side of unit 10. The interior of housing 44 communicates with that of the panel unit. Housing 44 contains a driver circuit for driving liquid crystal panel 22. The driver circuit is connected electrically to connector portion 46 which is provided on a side face of housing 44. Thus, the driver circuit can receive information signals to be displayed on panel 22 from a computer, e.g., a personal computer, through connector portion 46.

As seen from FIG. 1, circuit housing 44 projects at predetermined distances from upper and lower frame surfaces 16 and 18 and peripheral wall surface 20 of panel unit 10, at the boundary between housing 44 and unit 10. However, the distance or height of projection of housing 44 from lower frame surface 18 of unit 10 is somewhat shorter than the height of each fixed leg 42.

Case 12, which is adapted to encase panel unit 10 therein, is a plastic case next larger than frame 14 of unit 10. Rectangular inlet opening 48 for the panel unit is formed in that end face of case 12 on one short side thereof. A pair of guide tapes 50 are pasted on each of a pair of inner surfaces of case 12, which extend parallel to liquid crystal panel 22 of panel unit 10, as shown in FIG. 1. Only those guide tapes on the top-side inner surface of case 12 are shown in FIG. 1. Tapes 50, which are formed of synthetic resin, e.g., polyethylene, extend along the long sides of case 12 from inlet opening 48. Guide tape 50 have a thickness such that they can be in sliding contact with their corresponding frame surfaces 16 and 18 of panel unit 10 when unit 10 are inserted into case 12 through opening 48.

A pair of notches 54 are formed on opening edge 52 of case 12 defining inlet opening 48, at that portion of the edge which is continuous with the bottom-side inner surface of the case. Each notch 54 is situated corresponding to its corresponding fixed leg 42 of panel unit 10, and has a size such that it can receive leg 42 when unit 10 is housed in case 12.

Further, case 12 is fitted with handle 56 for the ease of carrying the presentation device. Handle 56 includes a pair of arms 58 and grip bar 60 connecting the respective distal ends of arms 58. The proximal end of each arm 58 is rockably mounted on its corresponding long-side edge of case 12.

Figure 3:
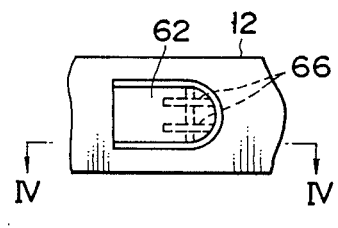
FIG. 3 is a schematic view showing part of a side edge of the case.
Figure 4:
FIG. 4 is a sectional view taken along line IV—IV of FIG. 3.

As shown in FIG. 3, moreover, elastically deformable tongues 62 are formed individually on the long-side edges of case 12 by partially cutting the side walls of the case. Each tongue 62 is adapted to engage its corresponding claw 64 on peripheral wall surface 20 of panel unit 10 when unit 10 is housed in case 12. As shown in FIG. 4, triangular projection 66, which is adapted to cooperate with claw 64, is formed on the inner surface of tongue 62. Thus, as panel unit 10 is inserted into case 12, each claw 64 of unit 10 get over projection 66 of its corresponding tongue 62 so that the tongue is elastically deformed, thereby engaging the rear side of the projection. In removing panel unit 10 from case 12, unit 10 is drawn out with a predetermined force so that projection 66 of tongue 62 is disengaged from claw 64 of unit 10, utilizing the elastic deformation of tongue 62. Thus, panel unit 10 can be removed from case 12.

In the presentation device described above, when panel unit 10 is not in case 12, as shown in FIG. 1, movable legs 26 of unit 10 are urged to project outward from their corresponding recesses 24 by torsion coil springs 32. Thus, if panel unit 10 is placed on a stage of the overhead projector, a gap of a predetermined distance, which depends on the heights of movable and fixed legs 26 and 42, is defined between the stage and liquid crystal panel 22 of unit 10. During the use of panel unit 10, therefore, panel 22 can be prevented from being adversely affected by heat from the inside of the projector.

When panel unit 10 is not in service, it is inserted into case 12 through inlet opening 48 so that movable legs 26 of the panel unit engage opening edge 52 of the case to be rocked thereby against the urging force of torsion coil spring 32. Thereupon, legs 26 are housed in their corresponding recesses 24, as indicated by two-dot chain line in FIG. 2.

When panel unit 10 is fully housed in case 12, opening edge 52 of the case engages a rise surface between unit 10 and circuit housing 44. Thus, the respective outer surfaces of housing 44 and case 12 are flush and continuous with each other, and fixed legs 42 of unit 10 are received by their corresponding notches 54 of the case.

It is to be understood that the present invention is not limited to the embodiment described above, and that various changes and modifications may be effected therein by one skilled in the art without departing from the scope or spirit of the invention. For example, movable legs 26 need not always be two in number, and only one movable leg will do. In this case, however, the single movable leg should preferably be situated halfway between the positions of paired movable legs 26 of FIG. 1.

In contrast with this, movable legs similar to movable legs 26 may be used in place of fixed legs 42. In this case, notches 54 of case 12 may be omitted.

What is claimed is:

1. A presentation device for an overhead projector, comprising:

a panel unit including a frame, a liquid crystal panel of a transmission type mounted in the frame and capable of displaying information, including characters and images to be projected, at least one recess on the outer surface of the frame, a movable leg having a proximal end rockably mounted in the recess by means of a pin, said movable leg being adapted to be fully housed in the recess when rocked in one direction, and to have its distal end project from the recess when rocked in the other direction, urging means for urging the movable leg to rock in the other direction, and stopper means disposed in the recess and adapted to restrain the movable leg from rocking in the other direction when the movable leg is urged to rock in the other direction by the urging means; and a case capable of encasing the panel unit therein, said case having an opening edge defining an inlet opening through which the panel unit is inserted into the case, said opening edge serving as an operating portion adapted to engage the movable leg, thereby rocking the movable leg in the one direction against the urging force of the urging means, so that the movable leg is housed in the recess, when the panel unit is inserted into the case through the inlet opening, in the direction perpendicular to the axial direction of the pin.

2. The presentation device according to claim 1, wherein said frame of said panel unit is a rectangular structure having four corner portions, and said recess, having the movable leg therein, is disposed at each of a pair of corner portions on that side of the frame which first enters the case when the panel unit is inserted into the case.

3. The presentation device according to claim 2, wherein a pair of fixed legs are disposed individually at the corner portions on the other side of said frame, and said opening edge of said case is provided with notches adapted to receive the fixed legs corresponding thereto when the panel unit is housed in the case.

4. The presentation device according to claim 3, wherein a circuit housing containing a driver circuit for driving the liquid crystal panel is formed integrally on that end face of the panel unit which is exposed from the inlet opening of the case when the panel unit is housed in the case, so that the circuit housing projects from the case.

5. The presentation device according to claim 4, wherein a rise surface is formed at the boundary between the circuit housing and the panel unit so as to surround the panel unit, said rise surface having a size such that the respective outer surfaces of the circuit housing and the case are flush and continuous with each other when the panel unit is housed in the case so that the opening edge of the case abuts against the rise surface.

6. The presentation device according to claim 1, wherein said urging means includes a torsion coil spring having a coil portion, attached to the movable leg so as to be coaxial with the pin, and a pair of arm portions anchored individually to the movable leg and the opening edge of the recess.

7. The presentation device according to claim 6, wherein said stopper means includes an inner wall of the recess.

8. The presentation device according to claim 7, wherein said movable leg is in plane contact with the inner wall of the recess when the movable leg is kept in contact with the inner wall of the recess by the urging force of the torsion coil spring.

* * * * *